(12) United States Patent
Chung et al.

(10) Patent No.: US 11,689,558 B2
(45) Date of Patent: Jun. 27, 2023

(54) ATTACK PATH DETECTION METHOD, ATTACK PATH DETECTION SYSTEM AND NON-TRANSITORY COMPUTER-READABLE MEDIUM

(71) Applicant: INSTITUTE FOR INFORMATION INDUSTRY, Taipei (TW)

(72) Inventors: Meng-Hsuan Chung, Taipei (TW); Chieh Lee, Taipei (TW); Hsiao-Hsien Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 858 days.

(21) Appl. No.: 16/589,104

(22) Filed: Sep. 30, 2019

(65) Prior Publication Data
US 2021/0075822 A1   Mar. 11, 2021

(30) Foreign Application Priority Data
Sep. 11, 2019   (TW) .................................. 108132856

(51) Int. Cl.
*H04L 29/06*   (2006.01)
*G06N 20/00*   (2019.01)
(Continued)

(52) U.S. Cl.
CPC ........... *H04L 63/1441* (2013.01); *G06N 7/01* (2023.01); *G06N 20/00* (2019.01); *H04L 63/1416* (2013.01)

(58) Field of Classification Search
CPC ............. H04L 63/1441; H04L 63/1416; H04L 2463/146; H04L 63/1425; G06N 20/00; G06N 7/005
See application file for complete search history.

(56) References Cited

U.S. PATENT DOCUMENTS 7,134,141 B2   11/2006  Crosbie et al.
8,281,397 B2   10/2012  Vaidyanathan et al.
(Continued)

FOREIGN PATENT DOCUMENTS

CN   106101252 A   11/2016
CN   106209856 A   12/2016
(Continued)

OTHER PUBLICATIONS

Abraham, Subil, and Suku Nair. "A predictive framework for cyber security analytics using attack graphs." arXiv preprint arXiv: 1502.01240 (pp. 1-17). (Year: 2015).*
(Continued)

*Primary Examiner* — Joseph P Hirl
*Assistant Examiner* — Thomas A Gyorfi
(74) *Attorney, Agent, or Firm* — CKC & Partners Co., LLC

(57) ABSTRACT

An attack path detection method, attack path detection system and non-transitory computer-readable medium are provided in this disclosure. The attack path detection method includes the following operations: establishing a connecting relationship among a plurality of hosts according to a host log set to generate a host association graph; labeling at least one host with an abnormal condition on the host association graph; calculating a risk value corresponding to each of the plurality of hosts; in a host without the abnormal condition, determining whether the risk value corresponding to the host without the abnormal condition is greater than a first threshold, and utilizing a host with the risk value greater than the first threshold as a high-risk host; and searching at least one host attach path from the high-risk host and the at least one host with the abnormal condition according to the connecting relationship of the host association graph.

17 Claims, 11 Drawing Sheets

(51) Int. Cl.
    *G06N 7/00*     (2023.01)
    *H04L 9/40*     (2022.01)
    *G06N 7/01*     (2023.01)

(56) References Cited

U.S. PATENT DOCUMENTS

| | | | |
|---|---|---|---|
| 9,591,006 B2 | 3/2017 | Siva Kumar et al. | |
| 10,015,177 B2 | 7/2018 | Muddu et al. | |
| 11,030,311 B1* | 6/2021 | Lopez | G06F 11/302 |
| 11,233,821 B2* | 1/2022 | Yadav | H04L 63/102 |
| 11,349,857 B1* | 5/2022 | Shah | G06F 16/2379 |
| 2015/0020199 A1* | 1/2015 | Neil | G06N 5/022 |
| | | | 726/23 |
| 2015/0180889 A1* | 6/2015 | Neil | G06N 5/02 |
| | | | 726/23 |
| 2019/0124104 A1* | 4/2019 | Apostolopoulos | G06F 16/9024 |
| 2020/0195673 A1* | 6/2020 | Lee | H04L 45/70 |
| 2020/0244673 A1* | 7/2020 | Stockdale | H04L 63/1416 |

FOREIGN PATENT DOCUMENTS

| | | |
|---|---|---|
| CN | 107683597 A | 2/2018 |
| CN | 109948335 A | 6/2019 |
| JP | 2018-160170 A | 10/2018 |
| JP | 2019-29798 A | 2/2019 |
| WO | 2017/061469 A1 | 4/2017 |

OTHER PUBLICATIONS

The office action of the corresponding Japanese application dated Oct. 6, 2020.

The office action of the corresponding Taiwanese application dated Apr. 30, 2020.

* cited by examiner

ATTACK PATH DETECTION METHOD, ATTACK PATH DETECTION SYSTEM AND NON-TRANSITORY COMPUTER-READABLE MEDIUM

CROSS-REFERENCE TO RELATED APPLICATION

This application claims priority to Taiwanese Application Serial Number 108132856, filed on Sep. 11, 2019, which is herein incorporated by reference.

BACKGROUND

Field of Invention

The present application relates to an information security method, system and non-transitory computer-readable medium. More particularly, the present application relates to an attack path detection method, attack path detection system and non-transitory computer-readable medium.

Description of Related Art

Advanced persistent threat (APT) refers to a hidden and persistent computer intrusion process. The initiator of the APT attack usually has the ability and intent to target a specific object in a sustained and effective manner. When a hacker enters the corporate intranet and acquires administrator privileges, it can move laterally, continue to attack the enterprise's intranet and steal data. However, the general anti-virus software could not detect the attack path when it is laterally moved, so it is difficult to effectively track the spread of lateral movement. Therefore, an attack path detection method for detecting automatically the attack path of lateral movement and decreasing the tracking time of administrator is required.

SUMMARY

An aspect of the disclosure is to provide an attack path detection method. The attack path detection method includes operations of: establishing a connecting relationship among a plurality of hosts according to a host log set to generate a host association graph, wherein the host log set comprises a log corresponding to each of the plurality of hosts; labeling at least one host with an abnormal condition on the host association graph; calculating a risk value corresponding to each of the plurality of hosts; in a host without the abnormal condition, determining whether the risk value corresponding to the host without the abnormal condition is greater than a first threshold, and utilizing a host with the risk value greater than the first threshold as a high-risk host; and searching at least one host attach path from the high-risk host and the at least one host with the abnormal condition according to the connecting relationship of the host association graph.

Another aspect of the disclosure is to provide attack path detection system. The attack path detection system includes a storage device and a processor. The processor is electrically connected to the storage device. The storage device is configured to store a host log set. The processor includes a host relationship establishing unit, an abnormal labeling unit, and a host calculating unit. The host relationship establishing unit is configured for establishing a connecting relationship among a plurality of hosts according to a host log set to generate a host association graph, wherein the host log set comprises a log corresponding to each of the plurality of hosts. The abnormal labeling unit is electrically connected to the host relationship establishing unit, and configured for labeling at least one host with an abnormal condition on the host association graph. The host calculating unit is electrically connected to the abnormal labeling unit, and configured for calculating a risk value corresponding to each of the plurality of hosts; in a host without the abnormal condition, determining whether the risk value corresponding to the host without the abnormal condition is greater than a first threshold, and utilizing a host with the risk value greater than the first threshold as a high-risk host. The host calculating unit is configured for searching at least one host attach path from the high-risk host and the at least one host with the abnormal condition according to the connecting relationship of the host association graph.

Another aspect of the disclosure is to provide a non-transitory computer-readable medium including one or more sequences of instructions to be executed by a processor for performing an attack path detection method, wherein the method includes operations of: establishing a connecting relationship among a plurality of hosts according to a host log set to generate a host association graph, wherein the host log set comprises a log corresponding to each of the plurality of hosts; labeling at least one host with an abnormal condition on the host association graph; calculating a risk value corresponding to each of the plurality of hosts; in a host without the abnormal condition, determining whether the risk value corresponding to the host without the abnormal condition is greater than a first threshold, and utilizing a host with the risk value greater than the first threshold as a high-risk host; and searching at least one host attach path from the high-risk host and the at least one host with the abnormal condition according to the connecting relationship of the host association graph.

Based on aforesaid embodiments, the attack path detection method, attack path detection system and non-transitory computer-readable medium primarily improve the problem of utilizing the internal log of the host for abnormal detection. This disclosure is capable of utilizing the connecting relationship among the hosts and detecting the abnormal entrance point to find the suspicious attack path, and then providing the suspicious attack path to the administrator. In some embodiments, this disclosure is able to decrease the tracking time of administrator; moreover, early detection of the entrance point of the APT attack can also reduce the probability of the APT attack.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
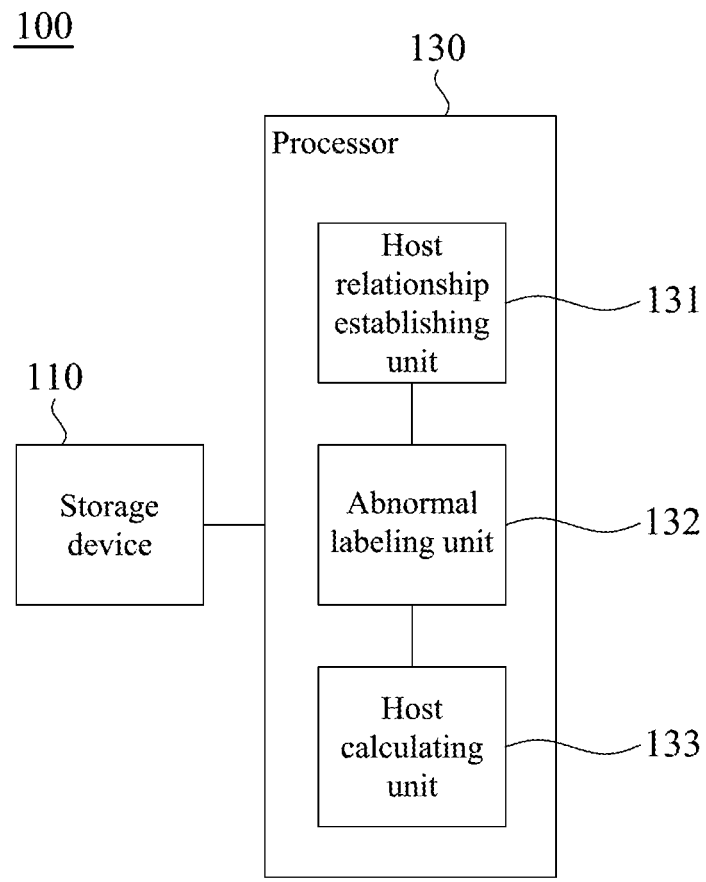
FIG. 1 is a functional block diagram illustrating an attack path detection system according to an embodiment of the disclosure.

Reference is made to FIG. 1, which is a functional block diagram illustrating an attack path detection system 100 according to an embodiment of the disclosure. As shown in FIG. 1, the attack path detection system 100 includes a storage device 110 and a processor 130. The storage device 110 is electrically connected to the processor 130. The storage device 110 is configured to store a host log set. The processor 130 includes a host relationship establishing unit 131, an abnormal labeling unit 132 and a host calculating unit 133. The abnormal labeling unit 132 is electrically connected to the host relationship establishing unit 131 and the host calculating unit 133.

In the embodiments of the disclosure, the processor 130 can be implemented by a microcontroller, a microprocessor, a digital signal processor, an application specific integrated circuit, a central processing unit, a control circuit and/or a graphics processing unit. The storage device 110 can be implemented by a memory, a hard disk, a flash drive, a memory card, etc.

Figure 2:
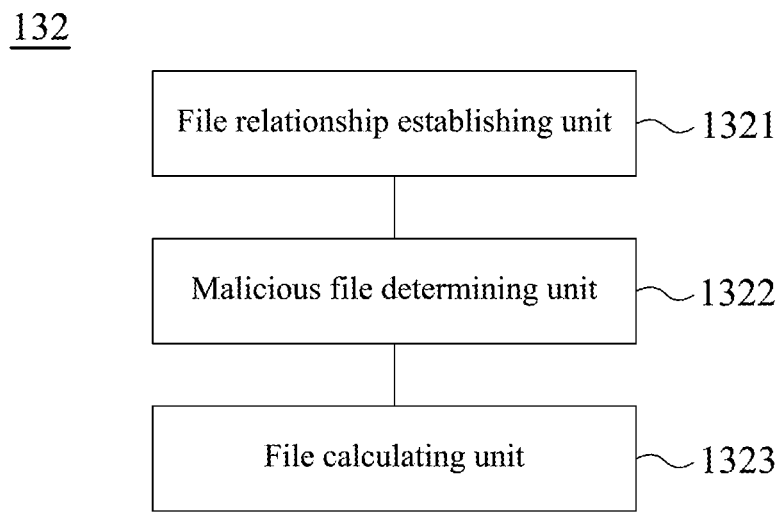
FIG. 2 is a functional block diagram illustrating the abnormal labeling unit according to an embodiment of the disclosure.

Reference is made to FIG. 2, which is a functional block diagram illustrating the abnormal labeling unit 132 according to an embodiment of the disclosure. As shown in FIG. 2, the abnormal labeling unit 132 includes a file relationship establishing unit 1321, a malicious file determining unit 1322, and a file calculating unit 1323. The malicious file determining unit 1322 is electrically connected to the file relationship establishing unit 1321 and the file calculating unit 1323.

Figure 3:
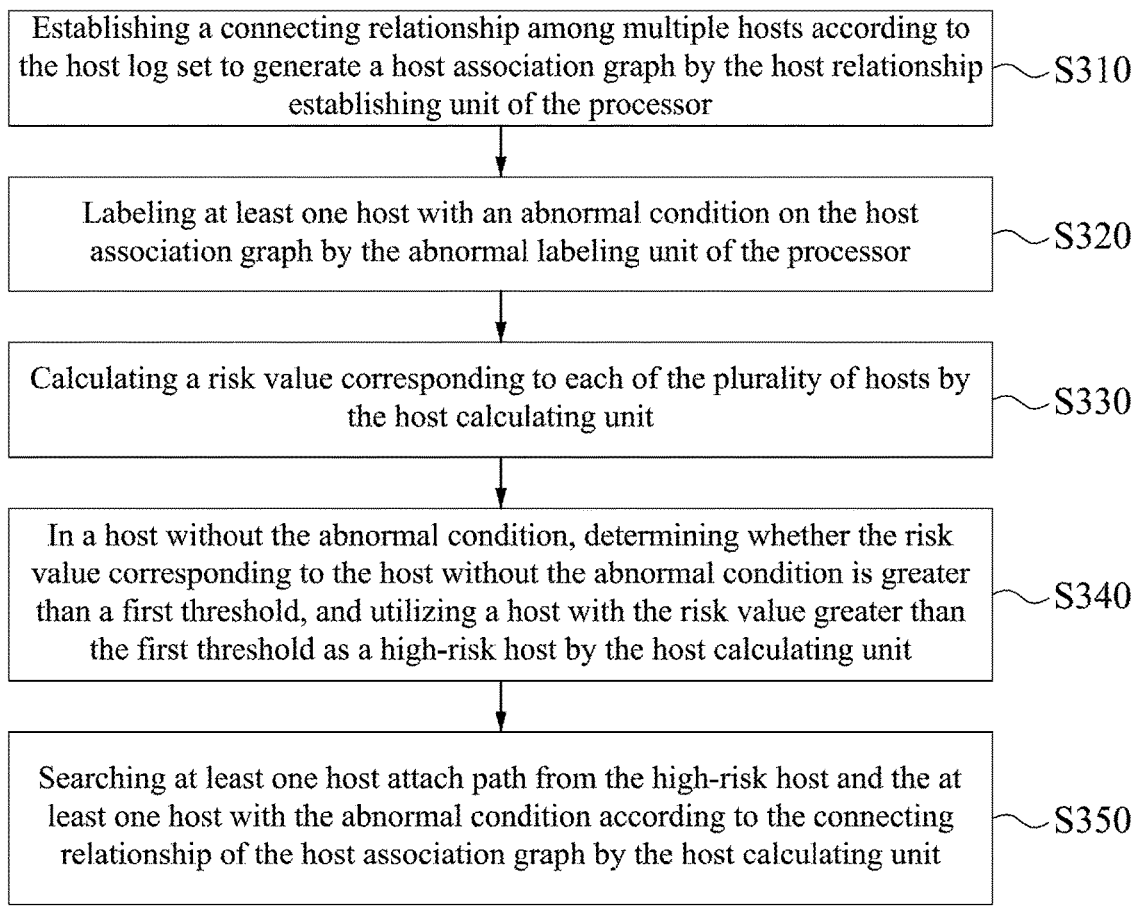
FIG. 3 is a flow diagram illustrating an attack path detection method according to an embodiment of this disclosure.

Reference is made to FIG. 3, which is a flow diagram illustrating an attack path detection method 300 according to an embodiment of this disclosure. In the embodiment, the attack path detection method 300 can be applied to the attack path detection system 100 of FIG. 1. The processor 130 is configured to determine whether the multiple hosts have the abnormal conditions and detect the suspicious attack path based on the connecting relationship among the multiple hosts according to the steps described in the following attack path detection method 300.

Reference is made to FIG. 1 and FIG. 3. The attack path detection method 300 firstly executes step S310 establishing a connecting relationship among multiple hosts according to the host log set to generate a host association graph by the host relationship establishing unit 131 of the processor 130. The host log set includes a log corresponding to each hosts. In the embodiment, the host relationship establishing unit 131 is configured to collect the logs of each hosts by utilizing monitoring tools (e.g. Procmon, Sysmon, etc.). Afterwards, the host relationship establishing unit 131 is configured to extract the required data field (e.g. event time, program ID, program path, source IP address, destination IP address, and destination program, etc.) for the log corresponding to each hosts to establish the connecting relationship between the program and the file or the connecting relationship between the programs. For example, if the host A is connected to the host D through the remote connecting program, it can be realized that the host A is connected to the host D.

Figure 4:
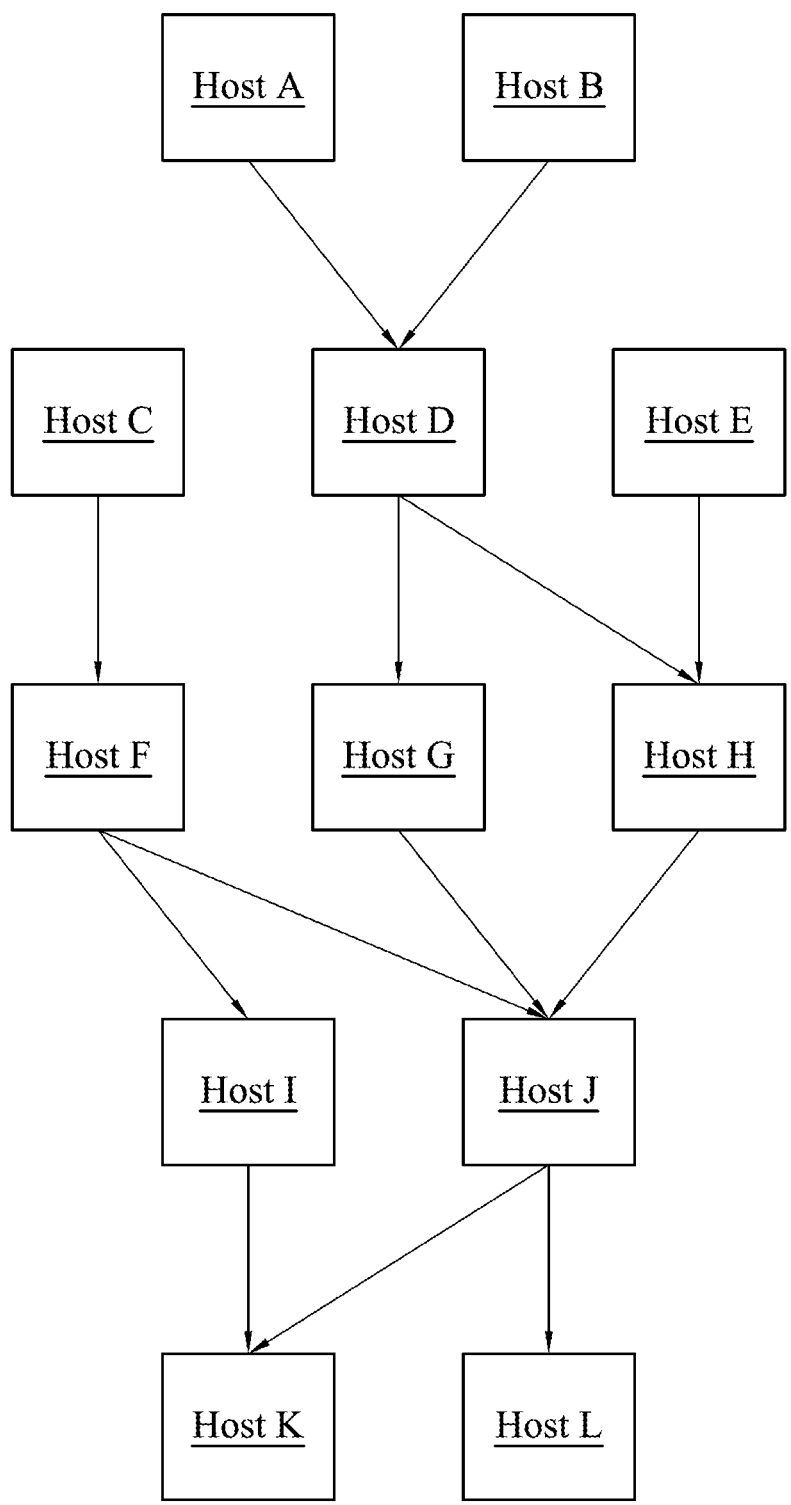
FIG. 4 is a schematic diagram illustrating the host association graph according to an embodiment of this disclosure.

Afterwards, the host connecting relationship diagram can be drawn by analyzing the connecting relationship among the programs of the hosts. Reference is made to FIG. 4, which is a schematic diagram illustrating the host association graph according to an embodiment of this disclosure. As shown in FIG. 4, the host association graph 400 includes hosts A~L, and the connecting relationship among the hosts A~L in the intranet can be shown in the host association graph 400. It is notices that the connecting relationship among the hosts A~L includes the connecting relationship between the source host and the destination host, and further includes the timestamp of the connection. Thus, it can utilize the timestamp to find out the connecting relationship among the hosts A~L in sequential. For example, the host D is the destination host of the host A and the host B; the host D is the source host of the host G and the host H, and the host E is the destination host of the host H.

Figure 5:
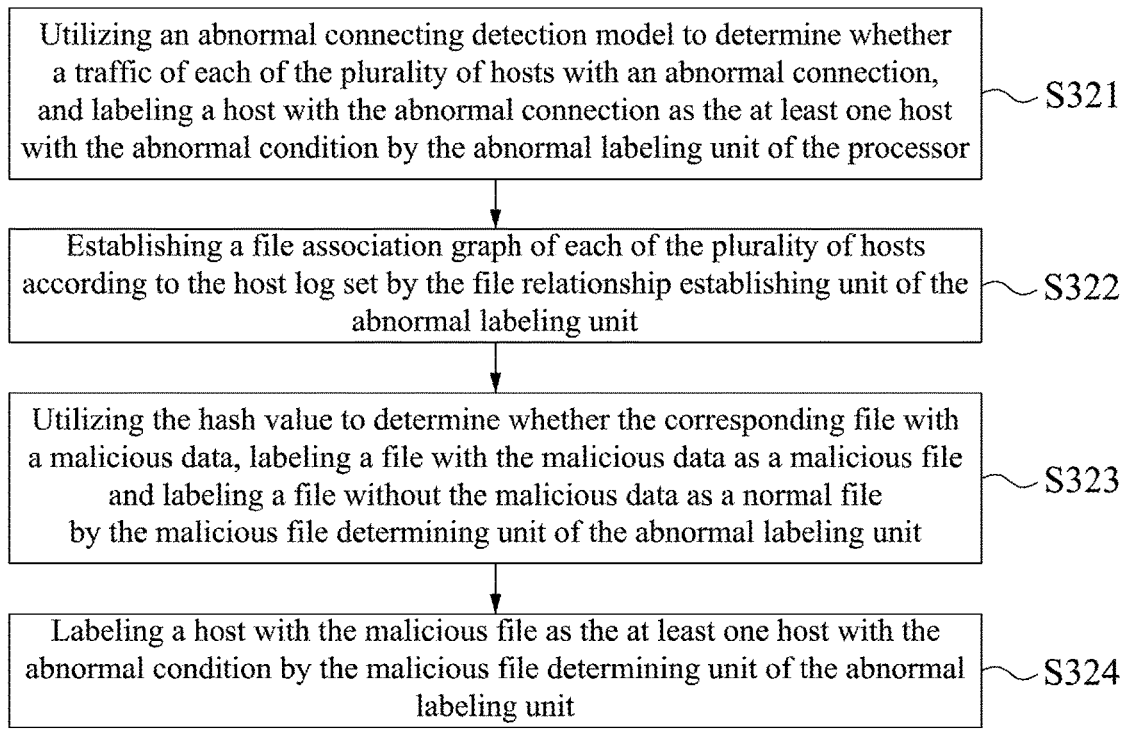
FIG. 5 is a flow diagram illustrating step S320 according to an embodiment of this disclosure.

As shown in FIG. 3, the attack path detection method 300 executes step S320 labeling at least one host with an abnormal condition on the host association graph by the abnormal labeling unit 132 of the processor 130. In the embodiment, the step S320 further includes steps S321~S324. Reference is made to FIG. 5, which is a flow diagram illustrating step S320 according to an embodiment of this disclosure. In the step S321, utilizing an abnormal connecting detection model to determine whether a traffic of each of the plurality of hosts with an abnormal connection, and labeling a host with the abnormal connection as the at least one host with the abnormal condition by the abnormal labeling unit 132 of the processor 130.

Before executing step S321, it is necessary to establish the abnormal connecting detection model. Further to say, the abnormal labeling unit 132 is configured to input a training traffic data set, wherein the training traffic data set includes multiple training traffic data of multiple training hosts, and each training traffic data is corresponding to a labeling result, respectively. The labeling result indicates whether traffic of each training hosts is abnormal. Afterwards, the abnormal labeling unit 132 is configured to utilize multiple training traffic data and the labeling result corresponding to each training traffic data as the training data. In the embodiment, the classifier can be trained by using a support vector machine (SVM), convolutional neural network (CNN), K-Nearest neighbor algorithm (KNN), etc. The trained analysis classifier can be as the abnormal connecting detection model, which is utilized to automatically determine whether traffic of each hosts with an abnormal connection. It is noticed that training traffic data can be realized as traffic of command and control channel (C&C channel). In particular, the abnormal connecting detection model is configured to perform the abnormal connection determination on the payload of the packet in the C&C channel.

In another embodiment, the abnormal connecting detection model can also be stored in the storage device 110 after being trained by an external processor. However, the disclosure is not limited thereto. When performing the step S321, the abnormal labeling unit 132 obtains the abnormal connecting detection model from the storage device 110 to determine whether the traffic of each hosts with the abnormal connection.

Figure 6:
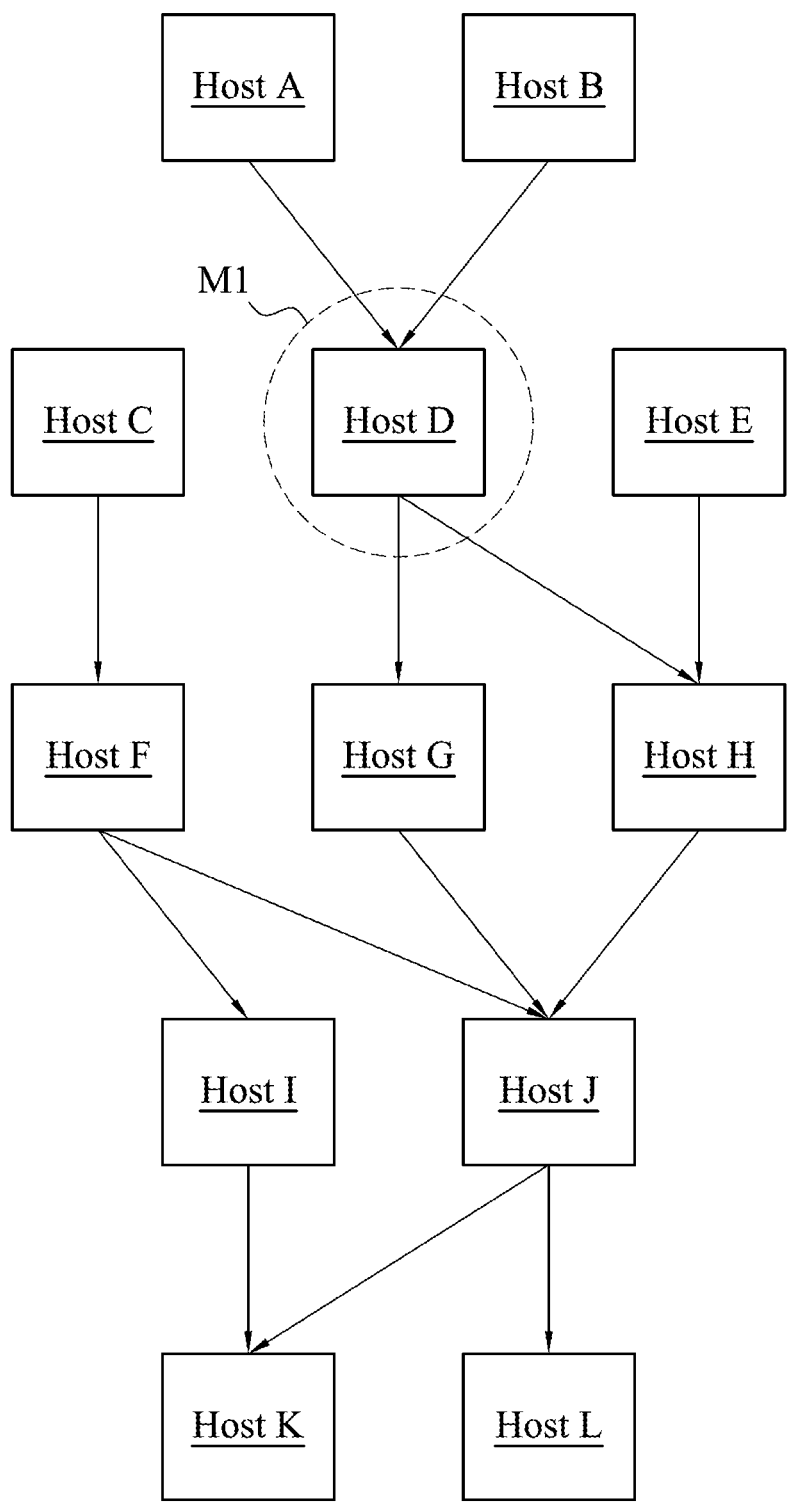
FIG. 6 is a schematic diagram illustrating the host association graph according to an embodiment of this disclosure.

Afterwards, when the abnormal labeling unit 132 finds out the host with the abnormal connection, and then labels the host with the abnormal connection as the at least one host with the abnormal condition. Reference is made to FIG. 6, which is a schematic diagram illustrating the host association graph according to an embodiment of this disclosure. Based on aforesaid embodiment, the abnormal labeling unit 132 is configured to utilize the abnormal connecting detection model to determine whether the hosts A~L with the abnormal connection. If one of the hosts A~L with the abnormal connection, the abnormal labeling unit 132 is configured to label an abnormal connection flag on the host association graph for the host with the abnormal connection. For example, as shown in FIG. 6, when the abnormal labeling unit 132 determines the host D with the abnormal connection, and then the abnormal connection flag M1 is labeled on the host D of the host association graph. It can be realized that the host D is the host with the abnormal connection, and the abnormal labeling unit 132 determines the host D with the abnormal connection as the host with an abnormal condition.

Reference is made to FIG. 2 and FIG. 5, in the step S322, establishing a file association graph of each of the plurality of hosts according to the host log set by the file relationship establishing unit 1321 of the abnormal labeling unit 132. Afterwards, each file association graph includes the file connecting relationships among multiple files corresponding to each hosts, and each files corresponds to a hash value, respectively. In the embodiment, the host log set includes the connecting relationship between the programs and the files in each host or the connecting relationship between the files in each host, and the hash value corresponding to each files. For example, the user can open the text file through file explorer (Windows Explorer), and it can be realized the program is connected to the file. Therefore, the file association graph can be generated by the content of the host logs. The processor 130 can be utilized that the hash function to generate the hash value corresponding to each files. However, the disclosure is not limited thereto.

Figure 7:
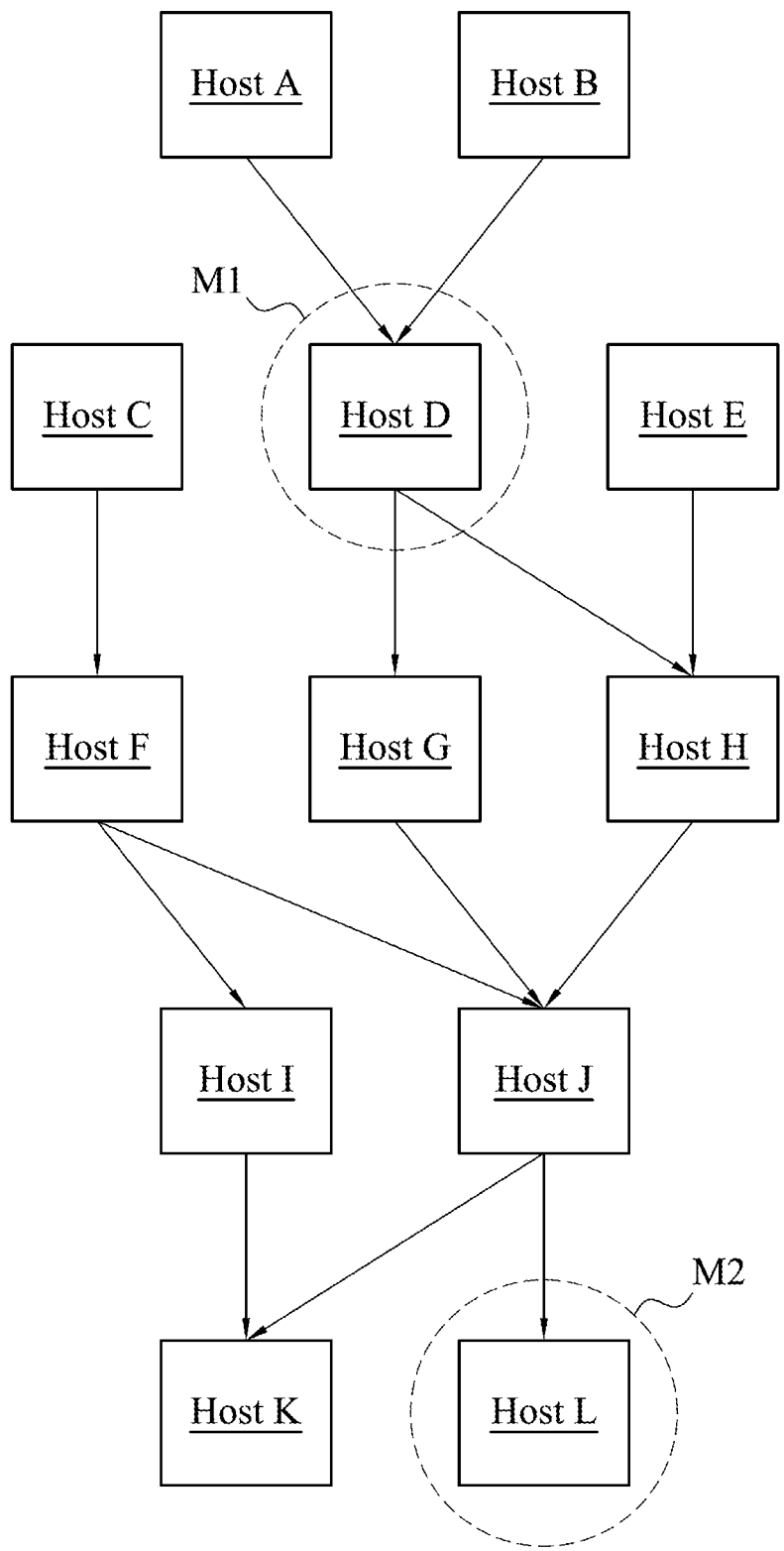
FIG. 7 is a schematic diagram illustrating the host association graph according to an embodiment of this disclosure.

Afterwards, in the step S323, utilizing the hash value to determine whether the corresponding file with a malicious data, labeling a file with the malicious data as a malicious file and labeling a file without the malicious data as a normal file by the malicious file determining unit 1322 of the abnormal labeling unit 132. Then, in the step S324, labeling a host with the malicious file as the at least one host with the abnormal condition by the malicious file determining unit 1322 of the abnormal labeling unit 132. Reference is made to FIG. 7, which is a schematic diagram illustrating the host association graph according to an embodiment of this disclosure. Based on aforesaid embodiment shown in FIG. 6, the malicious file determining unit 1322 is configured to utilize the hash value to determine whether the file with the malicious data inside each hosts. If there is the file with the malicious data inside the host, the malicious file determining unit 1322 is configured to label the host with the malicious file as the at least one host with the abnormal condition. As shown in FIG. 7, when the malicious file determining unit 1322 determines the host L with the malicious file, and then the abnormal event flag M2 is labeled on the host L of the host association graph. It can be realized that the host L is the host with the malicious file, and the malicious file determining unit 1322 determines the host L with the malicious file as the host with an abnormal condition.

It is noticed that there is no order between the operation of step S321 and the operation of steps S322~S324. The operation of step S321 may be performed before the operation of steps S322~S324, or the operation of steps S322~S324 may be performed before the operation of step S321. However, the disclosure is not limited thereto.

Figure 8A:
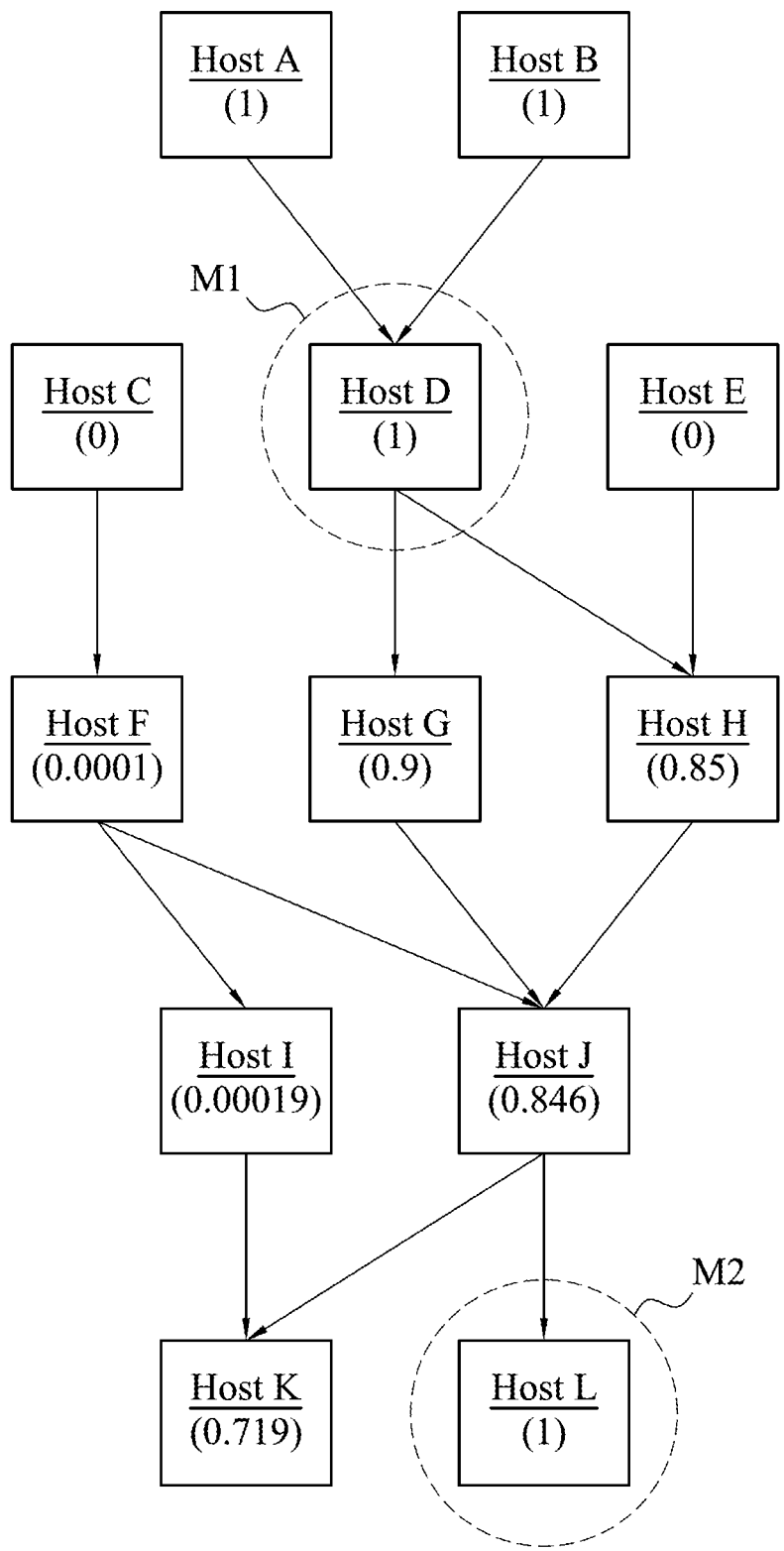
FIG. 8A is a schematic diagram illustrating the host association graph with the risk value according to an embodiment of this disclosure.

Reference is made to FIG. 3. After performing the step S320, the host (host D and host L) with the abnormal condition has been labeled on the host association graph. Afterwards, the attack path detection method 300 executes step S330, calculating a risk value corresponding to each of the plurality of hosts by the host calculating unit 133. Reference is made to FIG. 8A, which is a schematic diagram illustrating the host association graph with the risk value according to an embodiment of this disclosure. For example, the host calculating unit 133 set the risk value corresponding to the host D with the abnormal connection and the risk value corresponding to the host L with the malicious file as the abnormal risk value. In the embodiment, the abnormal risk value can be set as 1, and it can be realized that the host calculating unit 133 calculate an infected probability value for the host with the abnormal condition as 1.

Moreover, the host calculating unit 133 is further configured to determine whether the host with the abnormal connection has a source host according to the connecting relationship between each host in the host association graph. If the host with the abnormal connection has the source host, the host calculating unit 133 is configured to label the source host as the high-risk host. It can be realized that the high-risk host represent a high probability of infection. For example, the host calculating unit 133 further determines the host A and host B is the source host of the host D. Then, the host calculating unit 133 sets the risk value of the host D and host L as 1, and further determine determines the host A and host B is the source host of the host D with the abnormal connection. Therefore, the host calculating unit 133 sets the host A and host B as the high-risk host. In the embodiment, the host calculating unit 133 sets the risk value of the host A and host B as 1.

For the hosts without the abnormal condition, the host calculating unit 133 is configured to select the host without the abnormal condition as a selected host in sequence, and then calculate the corresponding risk value according to a first risk index and a second risk index of the selected host. In the embodiment, the first risk index indicates a probability that the selected host is infected by another host, and the second risk index indicates a probability that the selected host is infected by itself. As shown in FIG. 8A, the host calculating unit 133 utilizes the Bayesian network to calculate the risk value corresponding to the host C and the hosts E~K. The first risk index represents the contact infection rate in the Bayesian network, and the second risk index represents the intrinsic infection rate in the Bayesian network. In the embodiment, the contact infection rate is set as 0.9, and the intrinsic infection rate is set as 0.0001. The risk value of the host G is inferred based on the risk value of the host D. The conditional probability of host G is illustrated in table TB1, and thus the probability of the host G being infected is 0.9.

TABLE TB1

|  | D = 1(infection) | D = 0(uninfected) |
| --- | --- | --- |
| G = 1(infection) | 0.9 | 0.0001 |
| G = 0(uninfected) | 0.1 | 0.9999 |

Based on aforesaid embodiment, the risk value of host H is inferred based on the risk value of the host D and the host E. The conditional probability of host H is illustrated in table TB2, and thus the probability of the host H being infected is 0.85. In this case, the host E without the abnormal condition. Moreover, the host E is not connected to the host D, so the host E is not infected by host D. Therefore, the risk value of the host E can assume to be 0.

TABLE TB2

|  | D = 1(infection) | | D = 0(uninfected) | |
| --- | --- | --- | --- | --- |
|  | E = 1 | E = 0 | E = 1 | E = 0 |
| H = 1(infection) | 0.95 | 0.85 | 0.85 | $0.0001^2$ |
| H = 0(uninfected) | 0.05 | 0.15 | 0.15 | $1-0.0001^2$ |

Based on aforesaid embodiment, the risk value of host F is inferred based on the risk value of the host C. The conditional probability of host F is illustrated in table TB3, and thus the probability of the host F being infected is 0.0001. In this case, the host C without the abnormal condition. Moreover, the host C is not connected to the host D, so the host C is not infected by host D. Therefore, the risk value of the host C can assume to be 0.

TABLE TB3

|  | C = 1(infection) | C = 0(uninfected) |
| --- | --- | --- |
| F = 1(infection) | 0.9 | 0.0001 |
| F = 0(uninfected) | 0.1 | 0.9999 |

Based on aforesaid embodiment, the risk value of host J is inferred based on the risk value of the host F, the host G and the host H. The conditional probability of host J is illustrated in table TB4, and thus the probability of the host J being infected is 0.846. The calculation of the risk value of the host I and the host K are similar with aforesaid calculation. For the sake of brevity, those descriptions will not be repeated herein. Accordingly, the risk value of the host I is 0.00019, and the risk value of the host K is 0.719. The risk value corresponding to the hosts A~L are shown in FIG. 8A.

TABLE TB4

|  | G = 1(infection) | | | | G = 0(uninfected) | | | |
| --- | --- | --- | --- | --- | --- | --- | --- | --- |
|  | H = 1 | | H = 0 | | H = 1 | | H = 0 | |
|  | F = 1 | F = 0 | F = 1 | F = 0 | F = 1 | F = 0 | F = 1 | F = 0 |
| J = 1 | 0.96 | 0.86 | 0.86 | 0.83 | 0.86 | 0.83 | 0.83 | $0.0001^3$ |
| J = 0 | 0.04 | 0.14 | 0.14 | 0.17 | 0.14 | 0.17 | 0.17 | $1-0.0001^3$ |

Reference is made to FIG. 3. After performing the step S330, the attack path detection method 300 executes step S340, in a host without the abnormal condition, determining whether the risk value corresponding to the host without the abnormal condition is greater than a first threshold, and utilizing a host with the risk value greater than the first threshold as a high-risk host by the host calculating unit 133. In the embodiment, the first threshold is assumed as 0.75. The host calculating unit 133 is configured to determine the risk value of the hosts G, H, and J are greater than the first threshold in the hosts without the abnormal condition. Therefore, the host calculating unit 133 sets the hosts G, H, and J as the high-risk hosts.

Figure 8B:
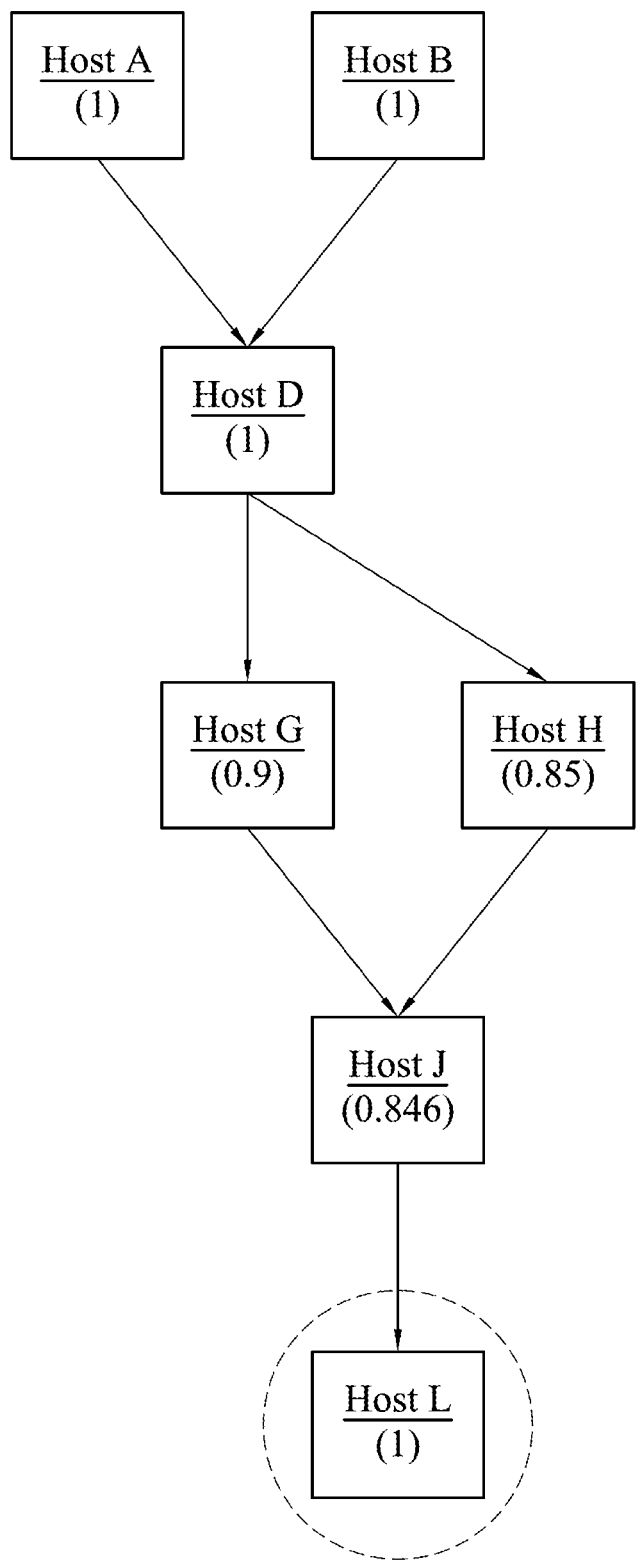
FIG. 8B is a schematic diagram illustrating the host association graph of the high-risk hosts and the host with the abnormal condition according to the FIG. 8A.

Afterwards, reference is made to FIG. 3 and FIG. 8B. FIG. 8B is a schematic diagram illustrating the host association graph of the high-risk hosts and the host with the abnormal condition according to the FIG. 8A. The hosts A, B, G, H, and J are the high-risk hosts, and the hosts D and L are the hosts with the abnormal condition. Afterwards, attack path detection method 300 executes step S350, searching at least one host attach path from the high-risk host and the at least one host with the abnormal condition according to the connecting relationship of the host association graph by the host calculating unit 133. In the embodiment, the host attach path can be searched by the depth first search (DFS). However, the disclosure is not limited thereto.

Therefore, the host calculating unit 133 is configured to find out four host attach path according to the connecting relationship among the hosts A, B, D, G, H, J and L. The first host attach path is the host A-the host D-the host G-the host J-the host L, in sequence. The second host attach path is the host A-the host D-the host H-the host J-the host L, in sequence. The third host attach path is the host B-the host D-the host G-the host J-the host L, in sequence. The fourth host attach path is the host B-the host D-the host H-the host J-the host L, in sequence.

Figure 9A:
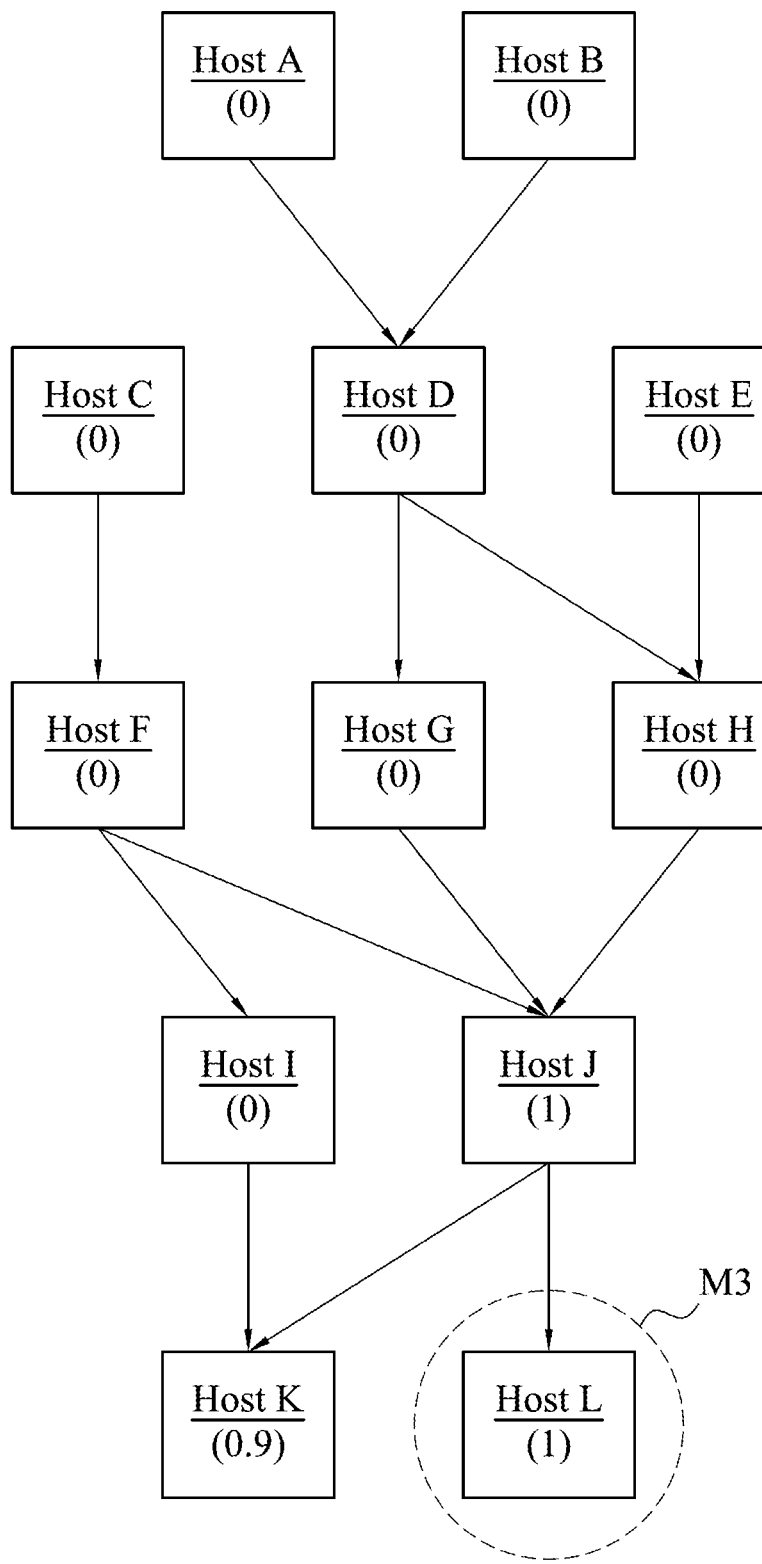
FIG. 9A is a schematic diagram illustrating the host association graph according to an embodiment of this disclosure.

In another embodiment, reference is made to FIG. 9A, which is a schematic diagram illustrating the host association graph according to an embodiment of this disclosure. In this case, the processor 130 determines the host L with the abnormal connection and there is no malicious file is found in other hosts. The processor 130 determines the host L with the abnormal condition, and then the abnormal connection flag M3 is labeled on the host L of the host association graph. Afterwards, according to the aforesaid embodiment, the host calculating unit 133 determines the host J (as the high-risk host) is the source host of the host L, and sets the risk value of the host J as 1. The host calculating unit 133 is configured to set the risk value of the host K as 0.9 and the risk value of other hosts A~I as 0. The host calculating unit 133 further determines that the host K is the high-risk host. The risk value corresponding to the hosts A~L are shown in FIG. 9A.

Figure 9B:
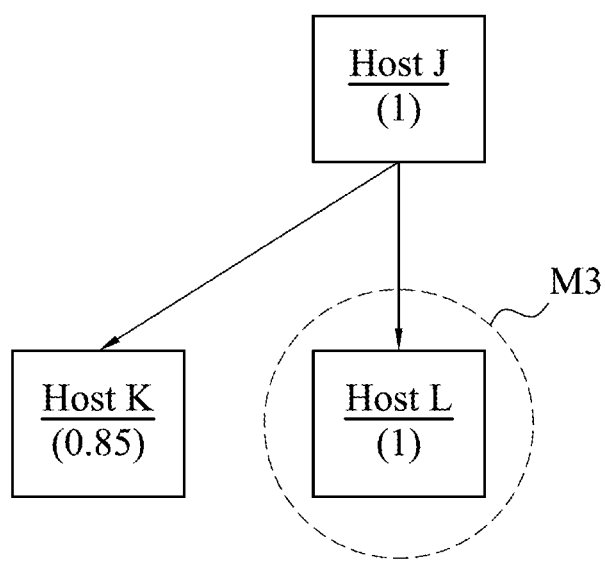
FIG. 9B is a schematic diagram illustrating the host association graph of the high-risk hosts and the host with the abnormal condition according to the FIG. 9A.

Afterwards, reference is made to FIG. 9B, which is a schematic diagram illustrating the host association graph of the high-risk hosts and the host with the abnormal condition according to the FIG. 9A. The host calculating unit 133 is configured to find out two host attach path according to the connecting relationship among the hosts J, K and L. The first host attach path is the host J-the host K, in sequence. The second host attach path is the host J-the host L, in sequence.

Figure 10:
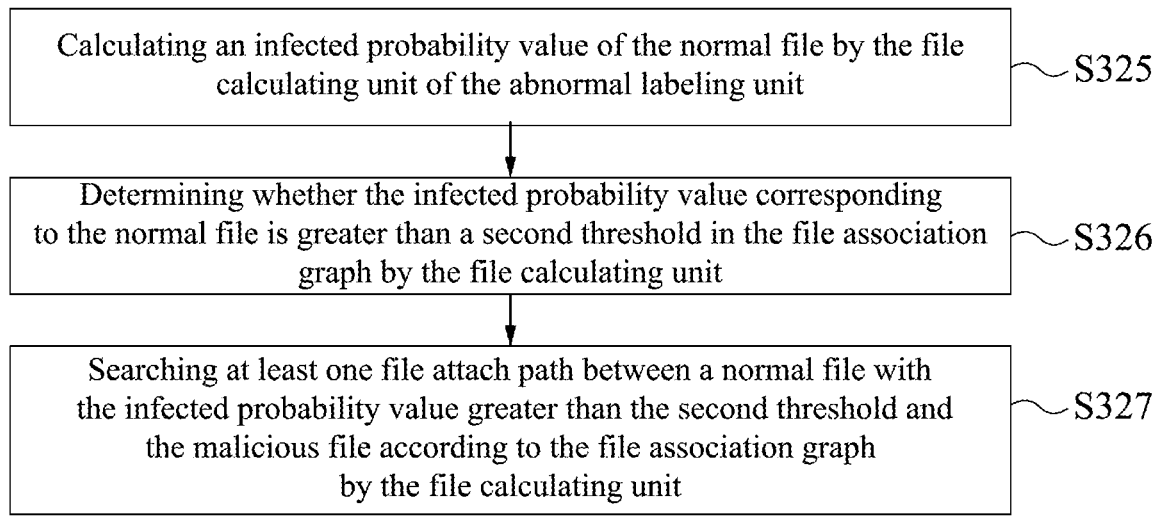
FIG. 10 is a flow diagram illustrating detecting the file attach path according to an embodiment of this disclosure.

Afterwards, in addition to detecting suspicious attack paths between hosts, the processor 130 also can detect attack paths of malicious files in each host. Reference is made to FIG. 10, which is a flow diagram illustrating detecting the file attach path according to an embodiment of this disclosure. As shown in FIG. 10, the operation of aforesaid step S324 is further performed the step S325, calculating an infected probability value of the normal file by the file calculating unit 1323 of the abnormal labeling unit 132. In the embodiment, the file calculating unit 1323 utilizes the Bayesian network to calculate infected probability value of each normal file. The operation of the calculation the infected probability value of the normal file by the file calculating unit 1323 is similar with the operation of the calculation the risk value of the host without the abnormal condition by the host calculating unit 133. For the sake of brevity, those descriptions will not be repeated herein.

Afterwards, in the step S326, determining whether the infected probability value corresponding to the normal file is greater than a second threshold in the file association graph by the file calculating unit 1323. In the embodiment, the second threshold is assumed as 0.8, and the operation of this step is similar with the operation of the step S340. For the sake of brevity, those descriptions will not be repeated herein.

Afterwards, in the step S327, searching at least one file attach path between a normal file with the infected probability value greater than the second threshold and the malicious file according to the file association graph by the file calculating unit 1323. In the embodiment, the file attach path can be searched by the depth first search (DFS). However, the disclosure is not limited thereto. The operation of this step is similar with the operation of the step S350. For the sake of brevity, those descriptions will not be repeated herein.

Based on aforesaid embodiments, the attack path detection method, attack path detection system and non-transitory computer-readable medium primarily improve the problem of utilizing the internal log of the host for abnormal detection. This disclosure is capable of utilizing the connecting relationship among the hosts and detecting the abnormal entrance point to find the suspicious attack path, and then providing the suspicious attack path to the administrator. In some embodiments, this disclosure is able to decrease the tracking time of administrator; moreover, early detection of the entrance point of the APT attack can also reduce the probability of the APT attack.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An attack path detection method, comprising:
    establishing a connecting relationship among a plurality of hosts according to a host log set to generate a host association graph, wherein the host log set comprises a log corresponding to each of the plurality of hosts;
    labeling at least one host with an abnormal condition on the host association graph, further comprising establishing a file association graph of each of the plurality of hosts according to the host log set, wherein each of the file association graph comprises a file connecting relationship among a plurality of files corresponding to each of the plurality of hosts, and each of the plurality of files corresponds to a hash value, utilizing the hash value to determine whether corresponding file has a malicious data;
    calculating a risk value corresponding to each of the plurality of hosts;
    in a host without the abnormal condition, determining whether the risk value corresponding to the host without the abnormal condition is greater than a first threshold, and utilizing a host with the risk value greater than the first threshold as a high-risk host; and
    searching at least one host attach path from the high-risk host and the at least one host with the abnormal condition according to the connecting relationship of the host association graph.

2. The attack path detection method of claim 1, wherein labeling the at least one host with the abnormal condition on the host association graph, further comprising:
    utilizing an abnormal connecting detection model to determine whether a traffic of each of the plurality of hosts with an abnormal connection, and labeling a host with the abnormal connection as the at least one host with the abnormal condition.

3. The attack path detection method of claim 2, further comprising:
inputting a training traffic data set, wherein the training traffic data set comprises a plurality of training traffic data of a plurality of training hosts, and each of the plurality of training traffic data is corresponding to a labeling result, respectively, wherein the labeling result indicates whether a traffic of each of the plurality of training hosts is abnormal; and
training the plurality of training traffic data and the labeling result corresponding to each of the plurality of training traffic data to generate the abnormal connecting detection model.

4. The attack path detection method of claim 2, wherein utilizing the hash value to determine whether corresponding file has the malicious data, further comprising:
labeling a file with the malicious data as a malicious file and labeling a file without the malicious data as a normal file; and
labeling a host with the malicious file as the at least one host with the abnormal condition.

5. The attack path detection method of claim 4, further comprising:
calculating an infected probability value of the normal file;
in each of the file association graph, determining whether the infected probability value corresponding to the normal file is greater than a second threshold; and
in each of the file association graph, searching at least one file attach path between a normal file with the infected probability value greater than the second threshold and the malicious file.

6. The attack path detection method of claim 1, wherein calculating the risk value corresponding to each of the plurality of hosts, further comprising:
selecting he host without the abnormal condition as a selected host in sequence; and
calculating corresponding risk value according to a first risk index and a second risk index of the selected host, wherein the first risk index indicates a probability that the selected host is infected by another host, and the second risk index indicates a probability that the selected host is infected by itself.

7. The attack path detection method of claim 2, further comprising:
determining whether the host with the abnormal connection has a source host according to the connecting relationship among the plurality of hosts; and
if the host with the abnormal connection has the source host, labeling the source host as the high-risk host.

8. The attack path detection method of claim 4, wherein the at least one host attach path comprises the host with the abnormal connection, the host with the malicious file and the host as the high-risk host.

9. An attack path detection system, comprising:
a storage device, configured for storing a host log set; and
a processor, electrically connected to the storage device, the processor comprises:
a host relationship establishing unit, is configured for establishing a connecting relationship among a plurality of hosts according to a host log set to generate a host association graph, wherein the host log set comprises a log corresponding to each of the plurality of hosts;
an abnormal labeling unit is electrically connected to the host relationship establishing unit, and configured for labeling at least one host with an abnormal condition on the host association graph, wherein the abnormal labeling unit further comprising:
a file relationship establishing unit, is configured for establishing a file association graph of each of the plurality of hosts according to the host log set, wherein each of the file association graph comprises a file connecting relationship among a plurality of files corresponding to each of the plurality of hosts, and each of the plurality of files corresponds to a hash value; and
a malicious file determining unit, is electrically connected to the file relationship establishing unit, and configured for utilizing the hash value to determine whether corresponding file has a malicious data; and
a host calculating unit is electrically connected to the abnormal labeling unit, and configured for calculating a risk value corresponding to each of the plurality of hosts; in a host without the abnormal condition, determining whether the risk value corresponding to the host without the abnormal condition is greater than a first threshold, and utilizing a host with the risk value greater than the first threshold as a high-risk host,
wherein the host calculating unit is configured for searching at least one host attach path between the high-risk host and the at least one host with the abnormal condition according to the connecting relationship of the host association graph.

10. The attack path detection system of claim 9, wherein the abnormal labeling unit is configured for utilizing an abnormal connecting detection model to determine whether a traffic of each of the plurality of hosts with an abnormal connection, and labeling a host with the abnormal connection as the at least one host with the abnormal condition.

11. The attack path detection system of claim 10, wherein the abnormal labeling unit is configured for inputting a training traffic data set, wherein the training traffic data set comprises a plurality of training traffic data of a plurality of training hosts, and each of the plurality of training traffic data is corresponding to a labeling result, respectively; and training the plurality of training traffic data and the labeling result corresponding to each of the plurality of training traffic data to generate the abnormal connecting detection model, wherein the labeling result indicates whether a traffic of each of the plurality of training hosts is abnormal.

12. The attack path detection system of claim 10, wherein the
malicious file determining unit is configured for labeling a file with the malicious data as a malicious file and labeling a file without the malicious data as a normal file; and labeling a host with the malicious file as the at least one host with the abnormal condition.

13. The attack path detection system of claim 12, wherein the abnormal labeling unit further comprising:
a file calculating unit, is electrically connected to the malicious file determining unit, and configured for calculating an infected probability value of the normal file; in each of the file association graph, determining whether the infected probability value corresponding to the normal file is greater than a second threshold; and in each of the file association graph, searching at least one file attach path between a normal file with the infected probability value greater than the second threshold and the malicious file.

14. The attack path detection system of claim 9, wherein the host calculating unit is further configured for selecting the host without the abnormal condition as a selected host in sequence; and calculating corresponding risk value according to a first risk index and a second risk index of the selected host, wherein the first risk index indicates a probability that the selected host is infected by another host, and the second risk index indicates a probability that the selected host is infected by itself.

15. The attack path detection system of claim 10, wherein the host calculating unit is further configured for determining whether the host with the abnormal connection has a source host according to the connecting relationship among the plurality of hosts; and if the host with the abnormal connection has the source host, labeling the source host as the high-risk host.

16. The attack path detection system of claim 12, wherein the at least one host attach path comprises the host with the abnormal connection, the host with the malicious file and the host as the high-risk host.

17. A non-transitory computer-readable medium including one or more sequences of instructions to be executed by a processor for performing an attack path detection method, wherein the method comprises:

establishing a connecting relationship among a plurality of hosts according to a host log set to generate a host association graph, wherein the host log set comprises a log corresponding to each of the plurality of hosts;

labeling at least one host with an abnormal condition on the host association graph, further comprising establishing a file association graph of each of the plurality of hosts according to the host log set, wherein each of the file association graph comprises a file connecting relationship among a plurality of files corresponding to each of the plurality of hosts, and each of the plurality of files corresponds to a hash value, utilizing the hash value to determine whether corresponding file has a malicious data;

calculating a risk value corresponding to each of the plurality of hosts;

in a host without the abnormal condition, determining whether the risk value corresponding to the host without the abnormal condition is greater than a first threshold, and utilizing a host with the risk value greater than the first threshold as a high-risk host; and searching at least one host attach path from the high-risk host and the at least one host with the abnormal condition according to the connecting relationship of the host association graph.

* * * * *